Oct. 18, 1960     J. H. SMITH ET AL     2,956,365
HOLDERS FOR FISH LURES
Filed June 6, 1955
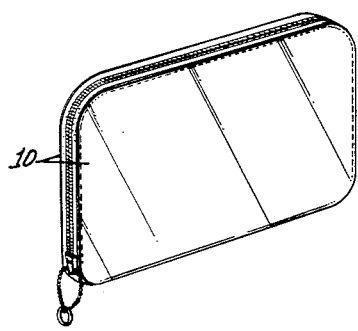
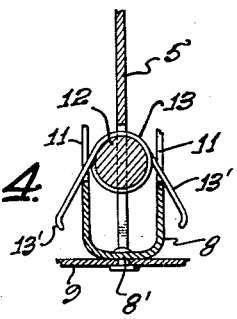
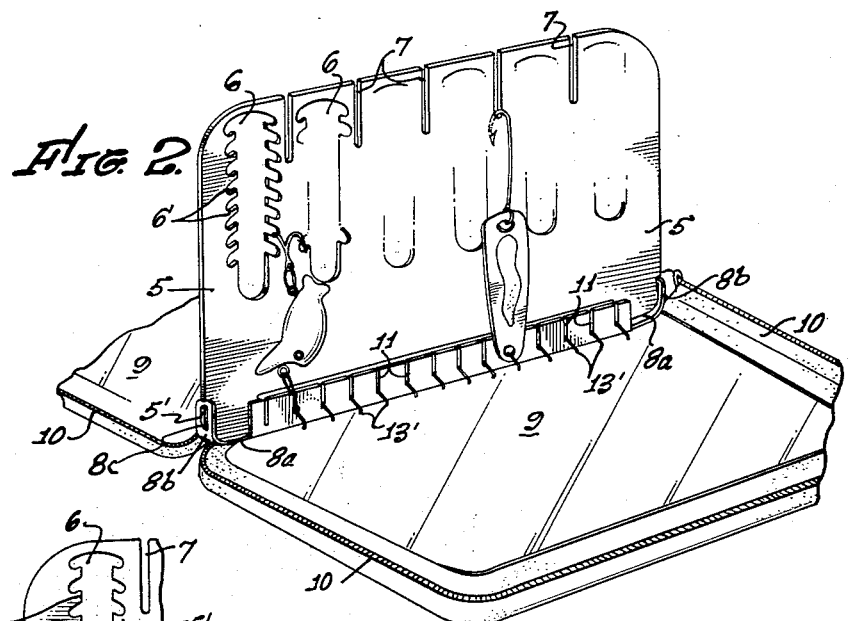
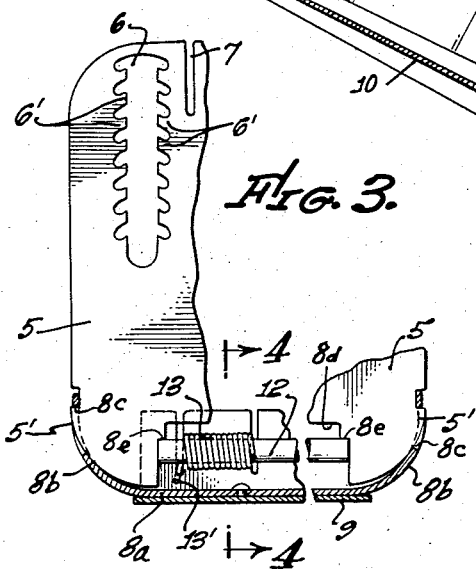
JUSTIN H. SMITH,
THAD VREELAND, JR.,
INVENTORS.

United States Patent Office 2,956,365
Patented Oct. 18, 1960

2,956,365

HOLDERS FOR FISH LURES

Justin H. Smith, 4004 Boston Ave., La Crescenta, Calif., and Thad Vreeland, Jr., 422 N. Gerona, San Gabriel, Calif.

Filed June 6, 1955, Ser. No. 513,457

7 Claims. (Cl. 43—54.5)

This invention relates to Holders for Fish Lures, and more particularly to certain improvements therein to increase its compactness, simplicity, efficiency and economy.

Among the salient objects of the invention are:

To provide a holder for fish lures which includes a body plate having means thereon for individually holding the opposite ends of fish lures at the sides of said plate, under tension, whereby they will not be accidentally disconnected;

To provide in connection with said body plate a channel-shaped member in which the lower edge of said body plate can be seated, and in which it can be interlocked so as to be removable from said member when desired;

To provide a holder for fish lures of the character referred to which can be placed within a pouch or pocket and closed, as with a zipper.

Other objects and advantages of the invention will be apparent from the following detailed description of one practical embodiment of the invention, taken in connection with the accompanying sheet of patent drawings in which:

Figure 1 is a perspective view of a complete holder for fish lures in closed condition and embodying the invention;

Figure 2 is an enlarged perspective view thereof, in open condition, with parts broken away to reduce the size of the figure;

Figure 3 is a fragmentary view, partly in section, showing details of construction and arrangement of the means for yieldingly holding the ends of fish lures; and Figure 4 is a fragmentary sectional view taken on line 4—4 on Fig. 3.

In the drawing, a body plate 5 is shown having formed therein a plurality of transversely extending openings, as 6, 6, the opposite edges of which openings have formed therein two series of upwardly directed lugs or short projections, as 6', 6', over which the upper ends of fish lures can be quickly placed. Also in the upper edge of said body plate are a plurality of slots, as 7, 7, open at their upper ends, as shown, and in which hooks can be placed, if desired.

The lower edge of said body plate 5 is set in a channel member 8, secured at its bottom, as at 8', to a supporting member 9, in the present showing being in the form of a pocket or pouch with opposite sides, as 9, 9, having upturned flange-like portions, as 10, 10, with zipper fastening means, as clearly illustrated in Fig. 1.

The opposite vertical sides of the channel member 8 are provided along their upper edges with slots 11. At the ends of the channel member its bottom portion is extended, as shown at 8a, these extensions curving upwardly in spring fingers 8b for enclosing the lower corners of the body plate 5, as illustrated in Fig. 2. Said upturned fingers 8b have openings 8c into which lugs 5' at the lower side edge portions of the plate 5 are adapted to snap. Formed in the lower edge portion of the body plate 5 is a slot or opening 8d, the opposite vertical edges of which are formed with steps or shoulders 8e.

Mounted within said channel member 8 to extend longitudinally thereof is a rod 12, the end portions of which underlie the shoulders 8e. Mounted on the rod 12 are short coil springs 13, each having relatively straight, oppositely extending, lateral ends 13' which provide resilient fingers under which the lower ends of fish lures can be hooked, as illustrated in Fig. 2. As will be observed from Figs. 2 and 4, the fingers 13' are movable in the slots 11 but normally engage against the bottom edges of these slots by reason of the pressure of the springs 13.

Assuming that the channel member 8 is secured in place upon the member 9 as shown at 8', the procedure carried out in assembling the several parts 8, 5, 12 and 13 is as next outlined. The rod 12, with the several coil springs 13 mounted thereon, is placed within the channel member 8 and during this step the end fingers 13' of the springs are guided into the slots 11 in the sides of the channel member.

With the rod 12 and springs 13, 13' thus positioned within the channel member, the plate 5 is held vertically, with its slotted end 7 uppermost. The plate 5 is now slid downwardly into the channel member 8 with its lower rounded corners riding along and camming the curved spring fingers 8b outwardly. During this movement, the shoulders 8e engage the ends of the rod 12 and continued movement of the plate 5 causes the rod to be depressed or lowered bodily within the channel member 8. Such lowering of the rod 12 causes the spring fingers 13' to engage the bottom edges of the grooves 11 to be stressed thereby as the rod is lowered further. Eventually, the lugs 5' of the plate 5 snap into the openings 8c to lock the several components 8, 5, 12, 13 in assembled relation. Due to the resilient action of the curved fingers 8b, the lugs 5' are positively engaged so as to retain the plate 5 in the position shown in the drawings.

The device thus serves as a holder for fish lures which are so placed that the hook end of each lure is engaged in a slot 7 or over a lug 6'. The other end of each lure is hooked over a separate finger 13' which yields upwardly to allow such connection of the lure, the finger then acting, by reason of its resiliency, to maintain the lure taut between the finger and the slot 7 or lug 6' as shown in Fig. 2. It is thus seen that each lure is mounted independently of the other lures by reason of the plurality of spring fingers 13', addition to or removal of lures from the device having no effect upon the tautness of the other lures in the holder.

If, for any reason, it is desired to disassemble the parts, this may be accomplished by first prying the curved fingers 8b outwardly so as to free the detent lugs 5'. The plate 5 then may be lifted from the channel member 8. By such removal of the plate 5, the rod 12 is released and may be withdrawn upwardly from the channel member with the finger hooks 13' of its coil springs 13 riding upwardly from the slots 11.

We are aware that changes in the details of construction and arrangement can be made in the showing herewith presented for illustrating the invention without departing from the spirit thereof, and we do not, therefore limit the invention to these details, except as we may be limited by the hereto appended claims.

We claim:

1. A holder for fish lures including a body plate having means in its upper part on which hooks, rings and eyes of fish lures can be hooked, a channel member opening upwardly and in which the lower edge of said body plate is seated, said member having vertical slots in its opposite sides, a series of helical torsion springs engaged in said member and having laterally extending fingers at their ends projecting through said slots to receive and hold the lower portions of the fish lures hooked on to the upper part of said body plate, said spring fingers being yieldable upwardly to receive the lower ends of the lures but normally flexed downwardly to hold said fish lures under pressure to prevent accidental detachment.

2. A holder for fish lures including a body plate having a plurality of openings therethrough with projections in the sides of said openings on which hooks and eyes of fish lures can be hooked, a channel member opening upwardly and in which the lower edge of said body plate is seated, said member having vertical slots in its opposite sides, and a series of helical torsion springs arranged in said member and having laterally projecting fingers at their ends projecting through said slots to receive and hold the lower portions of fish lures hanging from the projections on said body plate, said fingers being normally flexed downwardly whereby said fish lures are yieldingly held at both ends on said body plate.

3. A holder for fish lures including a body plate having means adjacent its upper edge to receive and hold hooks and eyes of fish lures placed thereon, a channel member opening upwardly in which the lower edge of said body plate is seated, the ends of said member being curved and extending upwardly to receive the lower opposite corners of said body plate, interlocking means on said curved ends and said corners of said body plate to hold them together, the opposite sides of said member having vertical slots therein, and a series of helical torsion springs anchored within said member and having laterally projecting fingers at their opposite ends projecting outwardly and downwardly through said slots to receive and hold the lower ends of fish lures on said body plate, whereby said fish lures are yieldingly held in place on said plate.

4. A holder for fish lures which includes a body plate having means on its upper part on which hooks, rings and eyes of fish lures can be hooked, a channel member adapted to receive and hold the lower edge of said body plate, a series of helical torsion springs spaced longitudinally within the member below said body plate and having oppositely disposed laterally projecting fingers at their opposite ends, which fingers project laterally outwardly from the member to receive the lower ends of fish lures from the upper part of said body plate, said fingers normally flexing downwardly so as to hold said fish lures under tension at the sides of said body plate, and means for detachably connecting the lower edge of said body plate within said channel member.

5. A holder for fish lures as set forth in claim 4, in which said member and the lower edge of said body plate are secured in an enclosure pocket to be covered thereby.

6. A holder for fish lures including a body plate having short slots in its upper edge, spaced therealong and having transverse openings therethrough, said openings having a series of upwardly projecting lugs on their opposite sides to receive hooks, rings and eyes of fish lures, a channel member adapted to receive and hold the lower edge of said body plate including means for detachably holding said body plate on said member, and a series of helical torsion springs having laterally projecting end fingers projecting from the opposite sides of said member to receive the lower ends of the fish lures on said body plate, said fingers normally flexing downwardly, whereby to hold said fish lures yielding by their opposite ends and under pressure of said spring fingers.

7. A holder for fish lures including a channel member having an open top, said member having a plurality of longitudinally-spaced, vertical slots in its sides, said member having upwardly curved, flexible extensions at its ends, said extensions having openings therein, a rod disposed within and extending longitudinally of the channel member, a plurality of coil torsion springs mounted coaxially on said rod and having relatively straight, oppositely disposed resilient ends providing fingers extending laterally through said vertical slots in the opposite side of the said member, and a vertical body plate having means adjacent its upper portion on which hooks, rings and eyes of fish lures can be hooked, said plate having a slot in its lower edge, the sides of the slot being provided with shoulders engageable against the ends of said rod for lowering the rod in said channel member against the tension of said spring fingers which engage against the bottom of said slots, upon downward sliding movement of said plate into said member, the lower corners of said plate being receivable within said curved extensions of said channel member and being provided with detent lugs for snapping into said openings to detachably connect the body plate to said channel member, said resilient fingers being yieldable upwardly to receive lower portions of the fish lures and normally sprung downwardly to hold the lures under pressure.

References Cited in the file of this patent

UNITED STATES PATENTS

| 1,451,256 | Gardner | Apr. 10, 1923 |
| 1,543,120 | Raber et al. | June 23, 1925 |
| 1,979,475 | Knettles | Nov. 6, 1934 |
| 2,080,794 | Squassoni | May 18, 1937 |
| 2,220,817 | Holmes | Nov. 5, 1940 |
| 2,253,598 | Africa | Aug. 26, 1941 |
| 2,616,559 | Hyland | Nov. 4, 1952 |
| 2,659,997 | Guestinger | Nov. 24, 1953 |